US006860808B2

(12) United States Patent
Levitan

(10) Patent No.: US 6,860,808 B2
(45) **Date of Patent: *Mar. 1, 2005**

(54) COIN AND BILL VIDEO GAME TERMINAL SYSTEM

(75) Inventor: Valery Levitan, Thornhill (CA)

(73) Assignee: JVL Corporation, Concord ( * ) Notice: Subject to any disclaimer, the term of this patent is extended or adjusted under 35 U.S.C. 154(b) by 455 days.

This patent is subject to a terminal disclaimer.

(21) Appl. No.: 09/991,671

(22) Filed: Nov. 26, 2001

(65) Prior Publication Data

US 2002/0032052 A1 Mar. 14, 2002

Related U.S. Application Data

(63) Continuation-in-part of application No. 09/577,821, filed on May 25, 2000, now Pat. No. 6,514,139.

(30) Foreign Application Priority Data

May 25, 2001 (WO) .............................. PCT/CA01/00740

(51) Int. Cl.[7] ................................................. A63F 13/00

(52) U.S. Cl. ............................. 463/16; 463/40; 463/42; 463/25

(58) Field of Search ................................ 463/1, 16, 25, 463/29, 40–42; 700/91; 705/14

(56) References Cited

U.S. PATENT DOCUMENTS 5,779,549 A 7/1998 Jorasch

FOREIGN PATENT DOCUMENTS

| | | |
|---|---|---|
| DE | 42 00 254 | 8/1993 |
| DE | 298 16305 U | 1/2000 |
| WO | WO 97 27568 A | 7/1997 |
| WO | WO 97 37737 | 10/1997 |
| WO | WO 98 18532 | 5/1998 |

*Primary Examiner*—John M. Hotaling, II

(57) ABSTRACT

A video game terminal system includes a tournament mode, as well as an option for a user to enter a random draw for each game played. This arrangement acts as an incentive for competitive play, as well as rewarding users for games played. The system also allows identification and tracking of users which is useful information for the terminal provider. Each terminal tracks games played and money received, and forwards the information to a central computer. Electronic financial tracking of revenue received allows the location operator to access and remove the actual cash received and the location operator is then billed by the terminal provider for his share of revenue received.

9 Claims, 8 Drawing Sheets

COIN AND BILL VIDEO GAME TERMINAL SYSTEM

This is a continuation-in-part of U.S. application Ser. No. 09/577,821 filed May 25, 2000 now U.S. Pat. No. 6,514,139.

BACKGROUND OF THE INVENTION

The present invention relates to video game terminal systems, and in particular, to video game terminal systems where a number of terminals are linked and share information with a remote computer.

Coin and bill operated video game terminals provide a popular source of entertainment are commonly provided in bars and restaurants.

The sophistication of the video games continues to increase and the processing capability and speed of the terminal has also increased. Most video game terminals now use a computer processor similar to pentium processors and include extensive memory storage arrangements for audio and graphical files used by the video games. Some video game terminals have as many as 60 (+) different games which can be played, some of which are very memory intensive, whereas other games such as simple card games, require much less memory.

The terminals provide additional revenue which is normally divided between the location owner and a company which is providing or leasing the terminal to the particular location. Some video game terminals have been linked with a central computer for operating certain games in a tournament mode. The game results of the particular tournament game are provided to a central computer and the results are accessible at each terminal. It is common in such tournaments to have a local leading score as well as the overall network leading scores.

Prizes have been suggested with respect to rewarding the individual leaders of the tournament but in many jurisdictions, such an arrangement is illegal. The advantage of the tournament mode is that it acts as an inducement and the number of games played per terminal typically goes up.

Surprisingly, some individual patrons are high users of the terminal and often this use is dominated by one particular game. From a marketing point of view, it would be desirable to have additional information with respect to the number of users using a particular terminal, the particular games played, as well as the frequency with which games are played by location and by user.

The present invention provides a system which encourages the identification of users and acts as an inducement promoting use of the terminal.

SUMMARY OF THE INVENTION

A video game terminal according to the present invention, allows for playing of a video game and the entry of information identifying the user. It also allows entry of the user in a random draw or contest. The apparatus game terminal comprises a payment arrangement for receiving payment and authorizing initiation of a game from a series of games retained in memory. A registration query provided on a touch screen of the game terminal allows the entry of registration information to properly identify a user. In addition the terminal allows entry of a PIN number assigned to a previously registered user to act as part of the sign in procedure.

The terminal includes a counting arrangement for maintaining a count for each registered user which count is incremented with each authorized game associated with the user. A communication arrangement associated with the terminal communicates with a separate remote computer and provides thereto the counts of the different registered users for entry in a random draw, based on each count providing an opportunity to win the draw.

According to an aspect of the invention, the game terminal provides the user with a host of games for selection and each game, when activated, by an identified registered user will increment the count of the user.

A video game terminal according to the present invention comprises a touch screen for accommodating user input of information, a series of games displayed on the touch screen for possible selection and play by user, either as a non identified user or as a particular registered user. The terminal includes a payment arrangement for accepting payment and initiating play of any of said series of games. An onscreen registration option is provided for registration of a player with the terminal, and automatically enters the player in a random draw based on the number of times games are played by the user and identified as being played by a particular user.

The game terminal includes a counting arrangement for tracking the number of games played by the registered user and automatically enters the registered users in a random draw based on the number of games played identified as being played by the registered user.

According to a further aspect of the invention, at least some of the games of the video game terminal are operated in a tournament mode and a ranking is provided of at least several leading registered users and their particular best game results.

According to yet a further aspect of the invention, the game terminal includes a communication arrangement for communicating registration information and count information of a registered user to a remote computer which maintains the information for entry in the random draw.

According to yet a further aspect of the invention, the game terminal includes a non volatile memory arrangement for maintaining registration and count information until such information is communicated to the remote computer.

According to yet a further aspect of the invention, only a limited number of games are operated in Random Draw (Touch and Win) mode at any given time and draw mode games are clearly identified and distinguishable from non tournament mode games when said games are displayed on said touch screen for selection.

According to yet a further aspect of the invention, the game terminal identifies certain games as being available for purchase by a user and payment for the purchase of the game made using said payment arrangement and delivery arrangement as provided by the user using the touch screen to enter sufficient information to allow delivery of the game. Profit from purchased game revenue received by the terminal is split between the manufacturer, operator and location according to a predetermined distribution.

According to yet a further aspect of the invention, the delivery information is an e-mail address and said game is provided in an e-mail to said e-mail address.

According to yet a further aspect of the invention, the terminal provides said game purchase and delivery information to said remote computer for delivery of said game to said e-mail address.

According to yet a further aspect of the invention, the video game terminal includes a revenue sharing arrangement. Revenue collected by the video game terminal is divided between an on site operator and a terminal provider. The terminal maintains an electronic count of revenue collected and communicates this electronic count to a remote computer using the communication arrangement. The on site operator is debited for the portion of the collected revenue due to the terminal provider for the benefit of the terminal provider, and the operator removes and receives the benefit of the revenue collected by the video game terminal.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
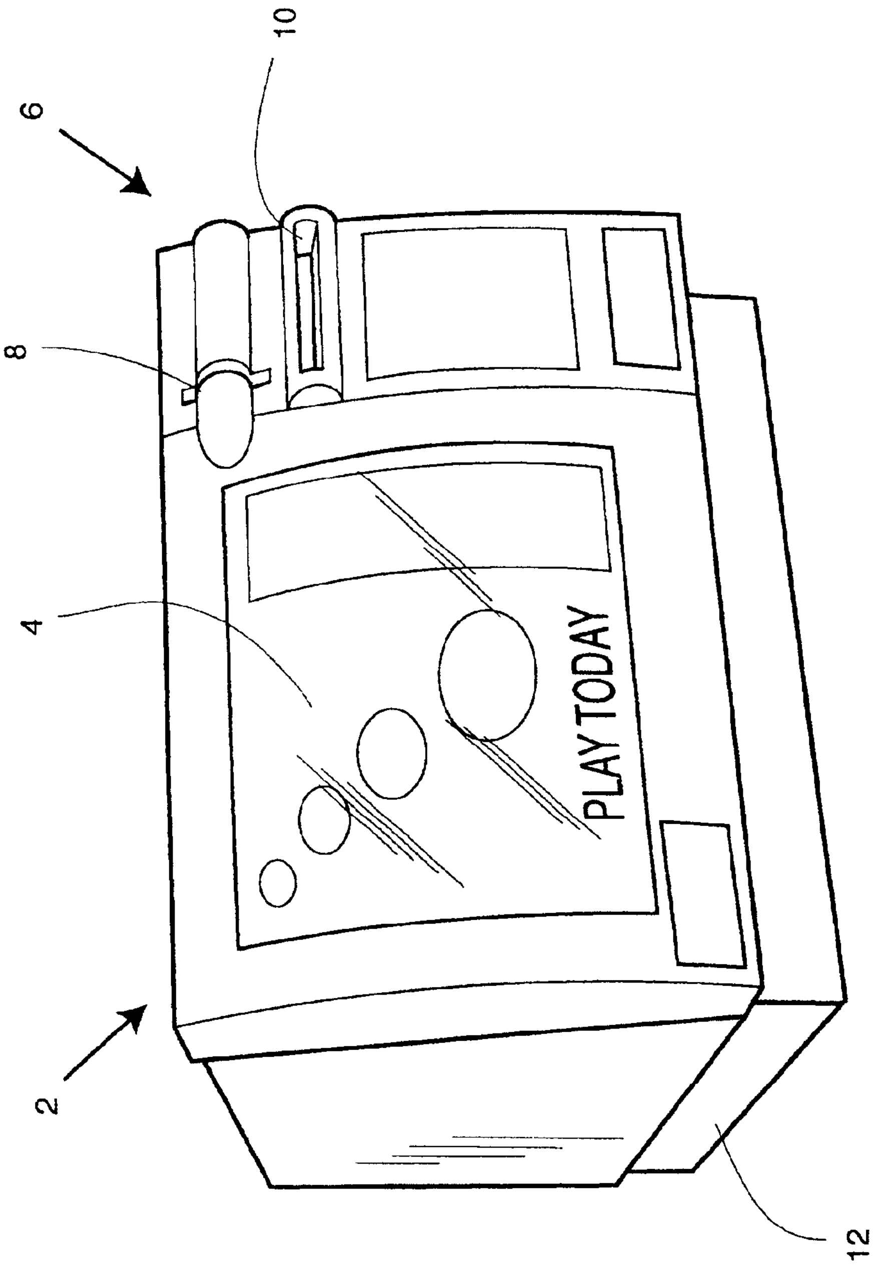
FIG. 1 shows a video game terminal.

The video game terminal 2 of FIG. 1 has a touch screen 4 for the input of information by the user to the terminal. The touch screen allows the user to play the particular game, to activate different games, and to input other information when necessary.

For example, the computer software can provide a representation on the touch screen which includes a registration screen having a keyboard representation at the bottom. This keyboard representation allows the user to input typed information to the terminal. A payment arrangement 6, in this case, includes a coin acceptor 8 and a bill acceptor 10. Other payment arrangements are possible.

The terminal has a communication cable 12 for connection to a communication system whereby information from the terminal can be communicated to a remote computer. Different types of communication arrangements can be used, including communication through the telephone system.

The video game terminal of FIG. 1 is typically provided in a bar or restaurant location.

Figure 2:
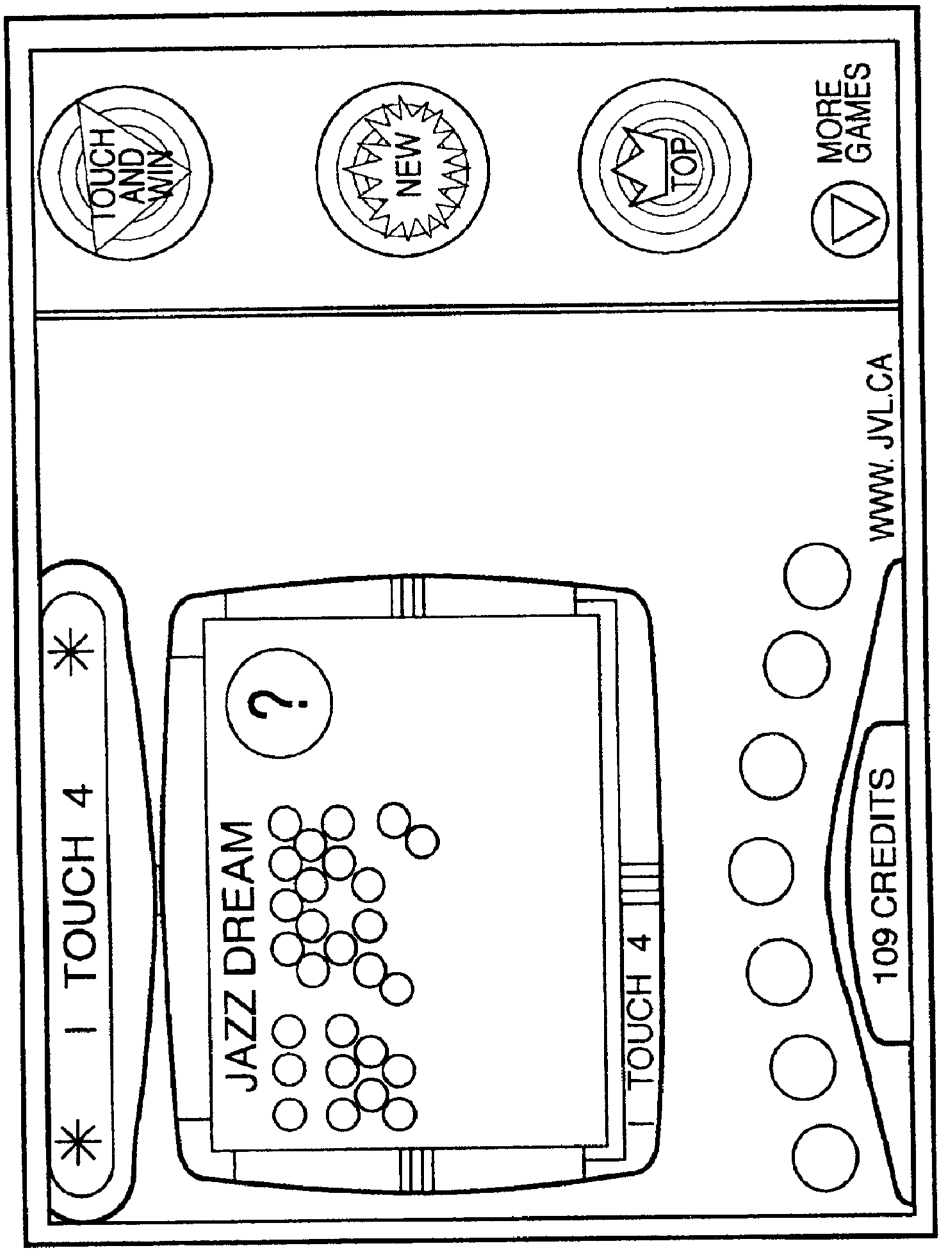
FIG. 2 shows one possible default screen used to allow a user to select a desired mode of play.

FIG. 2 shows one possible default screen. This screen promotes play of a particular game "JAZZ DREAM". Activation of the screen in the "JAZZ DREAM" area initiates the start of the game. Four activation areas "TOUCH AND WIN", "NEW", "TOP" and "MORE GAMES" are provided at the right hand edge. Activation of "TOUCH AND WIN" takes the player to the sign in screen of FIG. 3. Activation of "NEW" produces a screen illustrating new games. Activation of "TOP" takes the player to the screen of FIG. 6 listing the top games in the first column, and other game criteria in the second column. Activation of "MORE GAMES" provides a screen similar to the screen of FIG. 6 but having other games in the first column.

It has been found that different games appeal to different clients and games popular in one location may not be popular in another location. There is also a time element to certain games. For example, a new game may be introduced and become extremely popular only to be replaced in popularity by a different game sometime later. Typically, less than 50 percent of the games contribute 80 percent of the revenue, but the popular games vary from time to time. A player touches the screen at the appropriate location to activate a game, or input different instructions.

Figure 5:
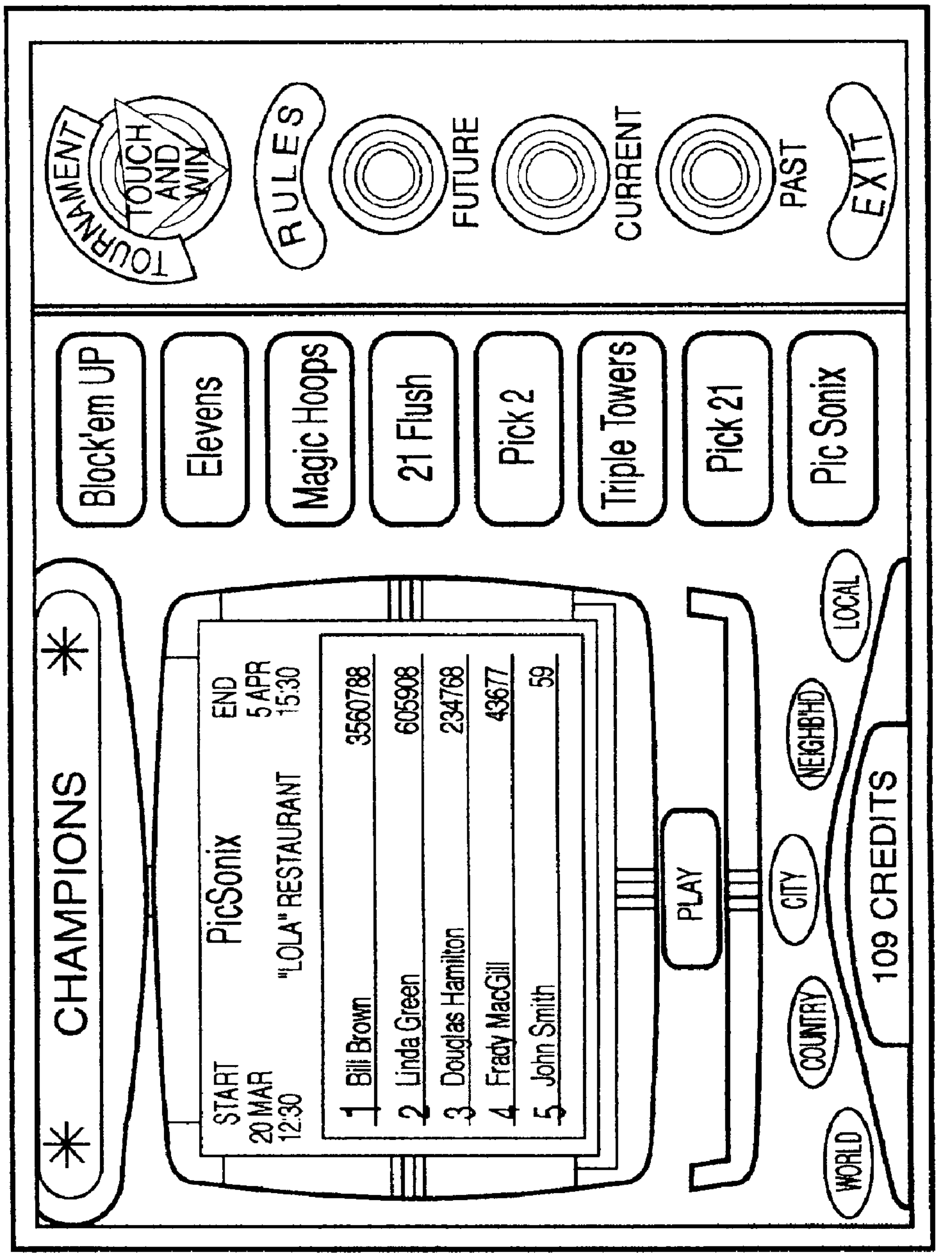
FIG. 5 is a tournament mode screen.
Figure 6:
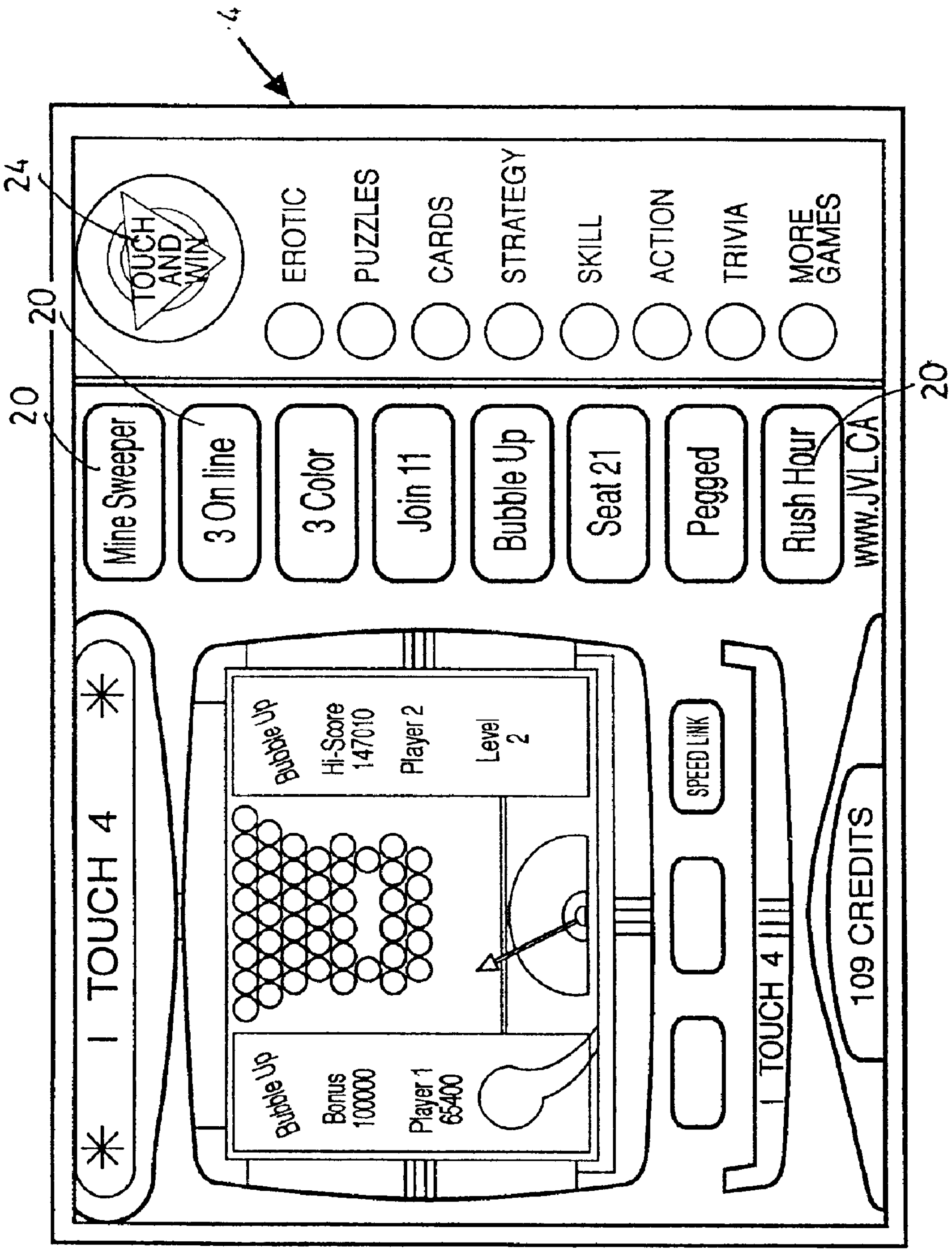
FIG. 6 is a game selection screen.

The touch screen 4 of FIG. 6 has icons 20 representing a partial listing of games that are possible. In addition, there is a tournament icon 24 (TOUCH AND WIN) allowing a player to activate the tournament function. Activation of this icon takes the player to the sign in screen of FIG. 3. A previously registered user fills in his "nickname" and password. Acceptance of these terms takes the player to the screen of FIG. 5.

The screen of FIG. 5 displays the present tournament or contest game "PICSONIX" and a list of present leaders. The first column of activation icons is a list of games including the present contest game "PICSONIX". The second column at the right hand edge of the activation screen provides details of the current contest "PICSONIX", details of past contest games, details of future contest games, as well as Rules of the contest. A play icon is also provided beneath the details of the contest game. It is preferred that only one game be in contest mode at any one point in time, however, multiple contest games can be operating at the same time.

Figure 3:
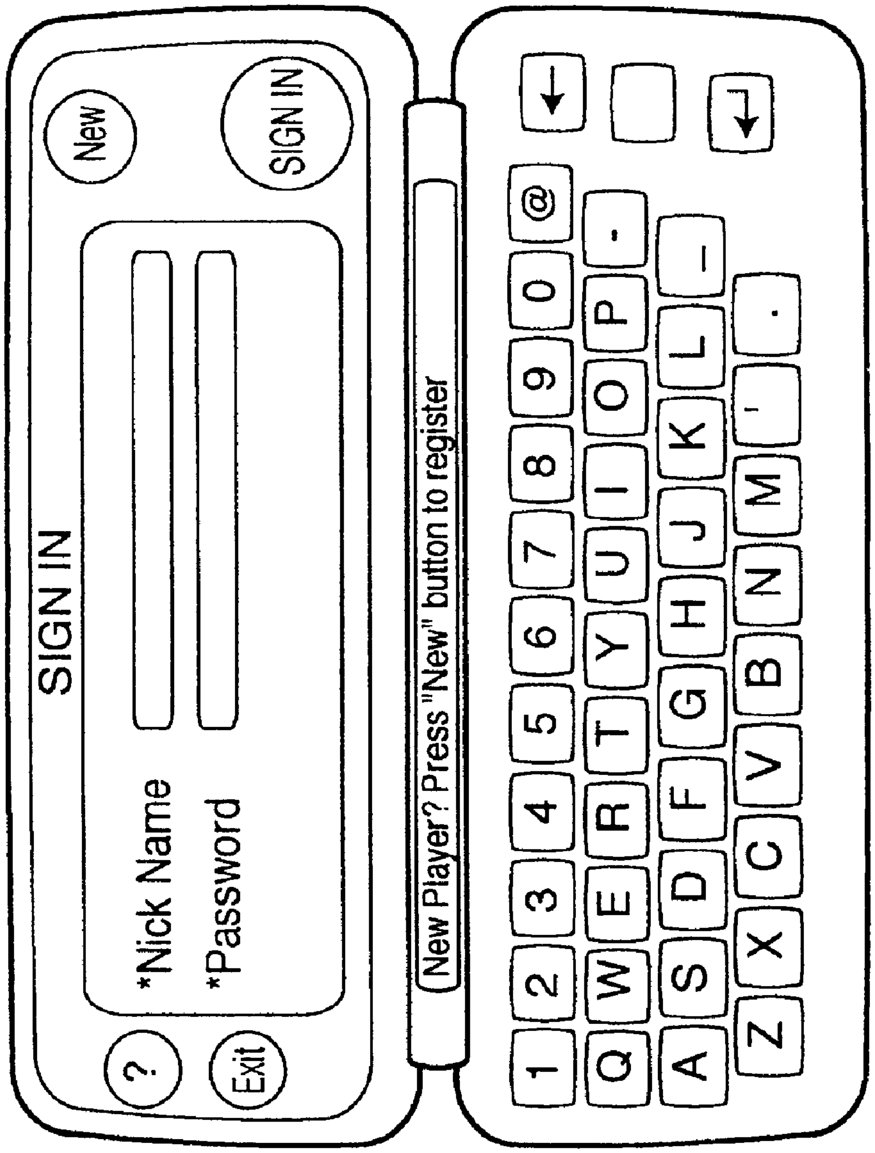
FIG. 3 is a screen used to allow a registered player to sign in or to allow a new player to be linked to a registration screen.
Figure 4:
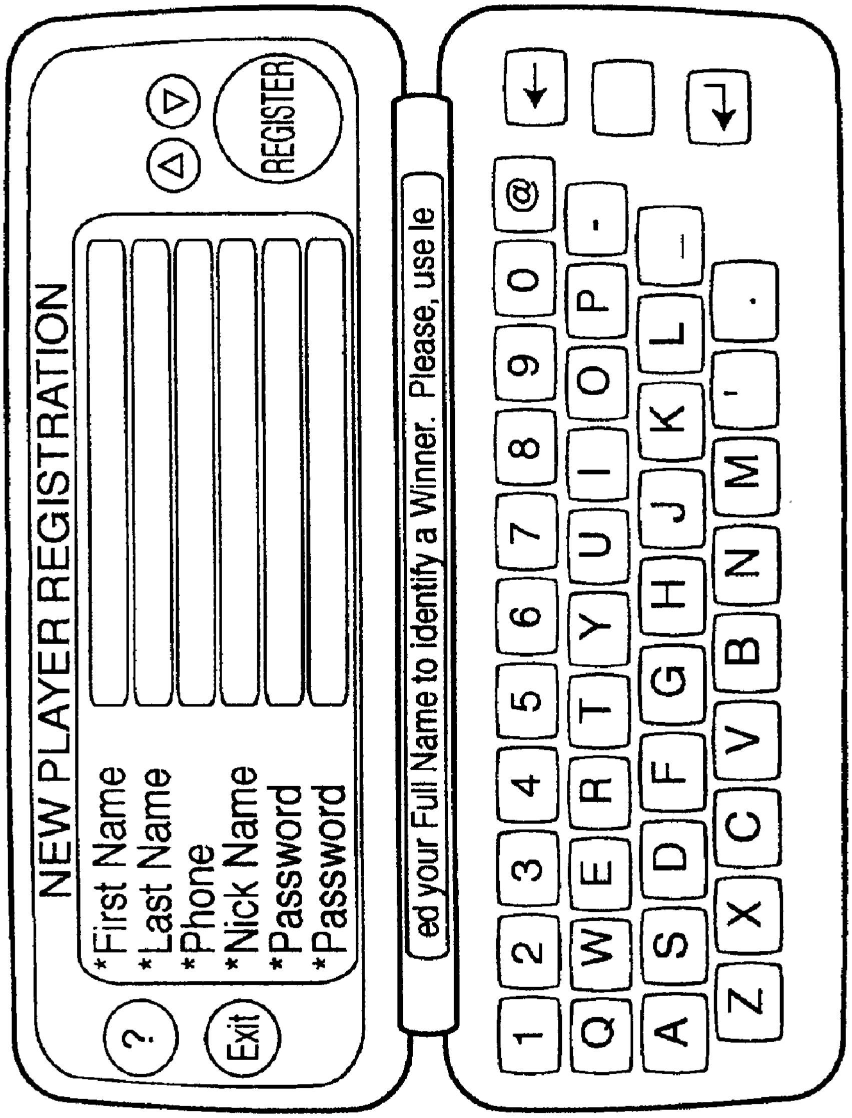
FIG. 4 is a player registration screen.

FIGS. 3 and 4 show screens with a keyboard representation 44 allowing a player to input information necessary for registration or sign in.

The coin operated video game terminals 2 provide additional revenue for the particular establishment which is shared with the provider of the terminal. The removal of the coins and bills which accumulate in the video game terminal has previously been labour intensive as the terminal provider is typically in control, or present, when the "cash box" is opened. This requires a collector to physically attend at each location and open each cash box with someone from the location being present. The funds can then be divided in the predetermined manner. Unfortunately, this approach is labour intensive and subject to shrinkage. Some steps to provide a cross check on the amount of revenue received by a terminal are provided in the form of an electronic count, however, the electronic count is often disputed.

Figure 7:
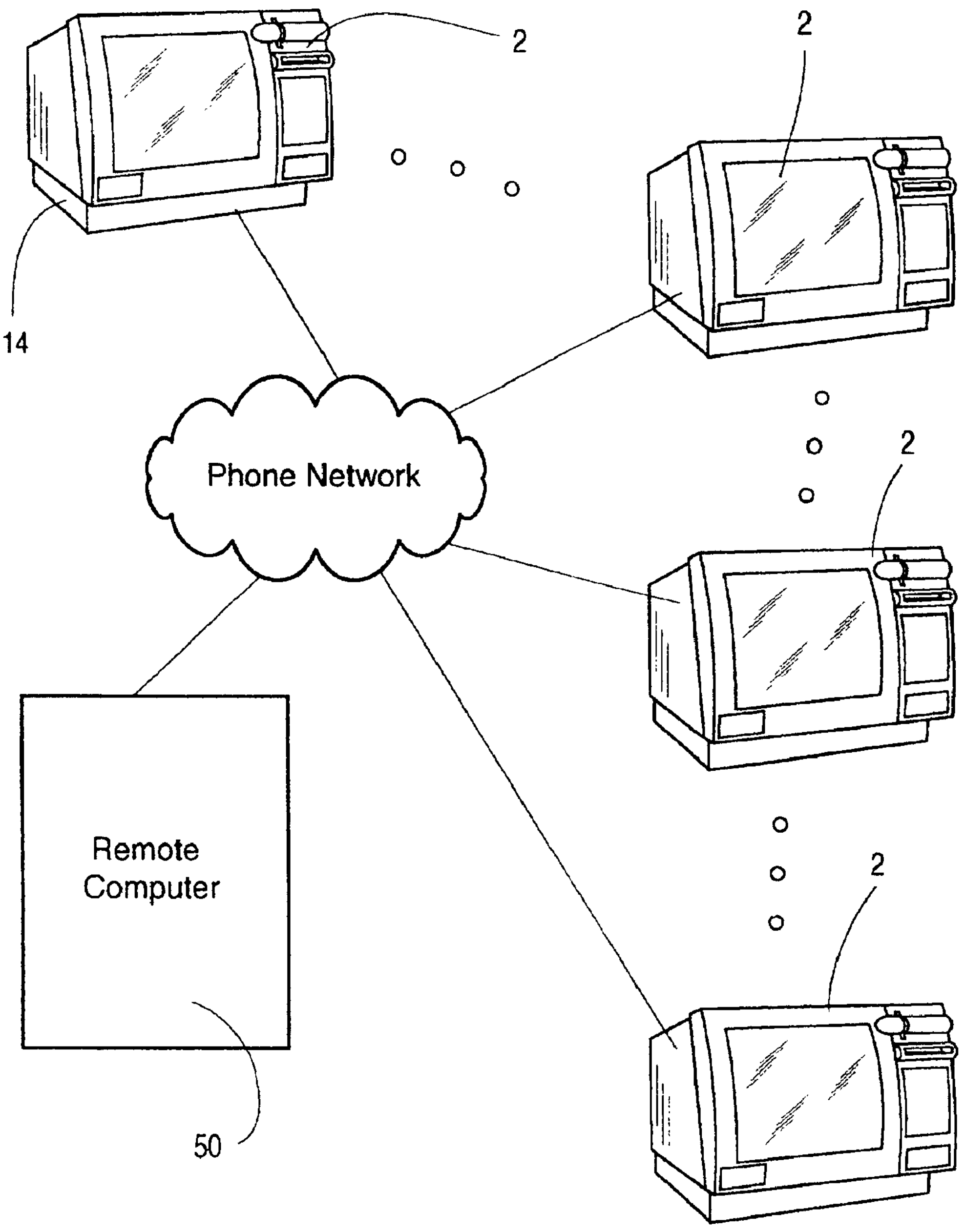
FIG. 7 is a schematic representation showing a series of game terminals linked by a remote computer.

Video game terminals which can operate in a tournament mode and in particular, a tournament mode where a host of different terminals are integrated such as that shown in FIG. 7, enhance revenue generation. The operation of a tournament mode where prizes are awarded are illegal in some jurisdictions. This is unfortunate as such tournaments do normally significantly increase the number of games played. The video game terminal of the present invention allows for a tournament mode where the individual results of a terminal are communicated to the remote computer 50 shown in FIG. 5. These results are tabulated and maintained and the overall leaders from all terminals are provided to each terminal for posting (see FIG. 5). The tournament is operated for personal satisfaction and the satisfaction derived from the competition. No prizes are awarded.

The video game terminal allows registration of a player by completing the registration screen of FIG. 4. During registration, a user inputs a "nickname" and a password, as well as his real name, and telephone number. The password and "nickname" allows the player to use the simplified sign in screen of FIG. 3 for subsequent games. The tournament mode does not assign prizes and merely allows different players to compete with players within their own location as well as to compete with players from other locations. The results are posted and tabulated and are viewable on each of the terminals. In addition, the registration process allows identification of the users and tracking of the games by user which information is available to the location operator and the terminal provider.

Furthermore, each registered user, when he initiates a game, is automatically entered in a random draw for which prizes are awarded. For each additional game that he plays, an additional entry in the random draw is made. This rewarding of registered users for playing of games by entry into a random draw, based on games played, satisfies the legal requirements of many jurisdictions. It has also been found to enhance the participation by all users as the prizes are not associated with the skill of the user. Skilled players still have the possibility to compete against other skilled players for the pure competitive enjoyment thereof with their results being posted to the particular terminals. In addition, they are entered in the random draw.

This format also is applicable to different types of game terminals and terminals of different speeds. Not all game terminals are identical and in most cases, there will be several different models which operate at different speeds. The speed of the game terminal increases the maximum game performance. Therefore, a skilled player using an older, slower game terminal is at a disadvantage relative to a skilled player using a faster game terminal. With the present system the awarding of prizes is based on games played and is unaffected by game results. This arrangement allows more game terminals to participate without a bias in the contest. Furthermore, not all terminals may operate the same games and entry to draw can be associated with games on one type of terminal and different group of games on a different type of terminal.

Figure 8:
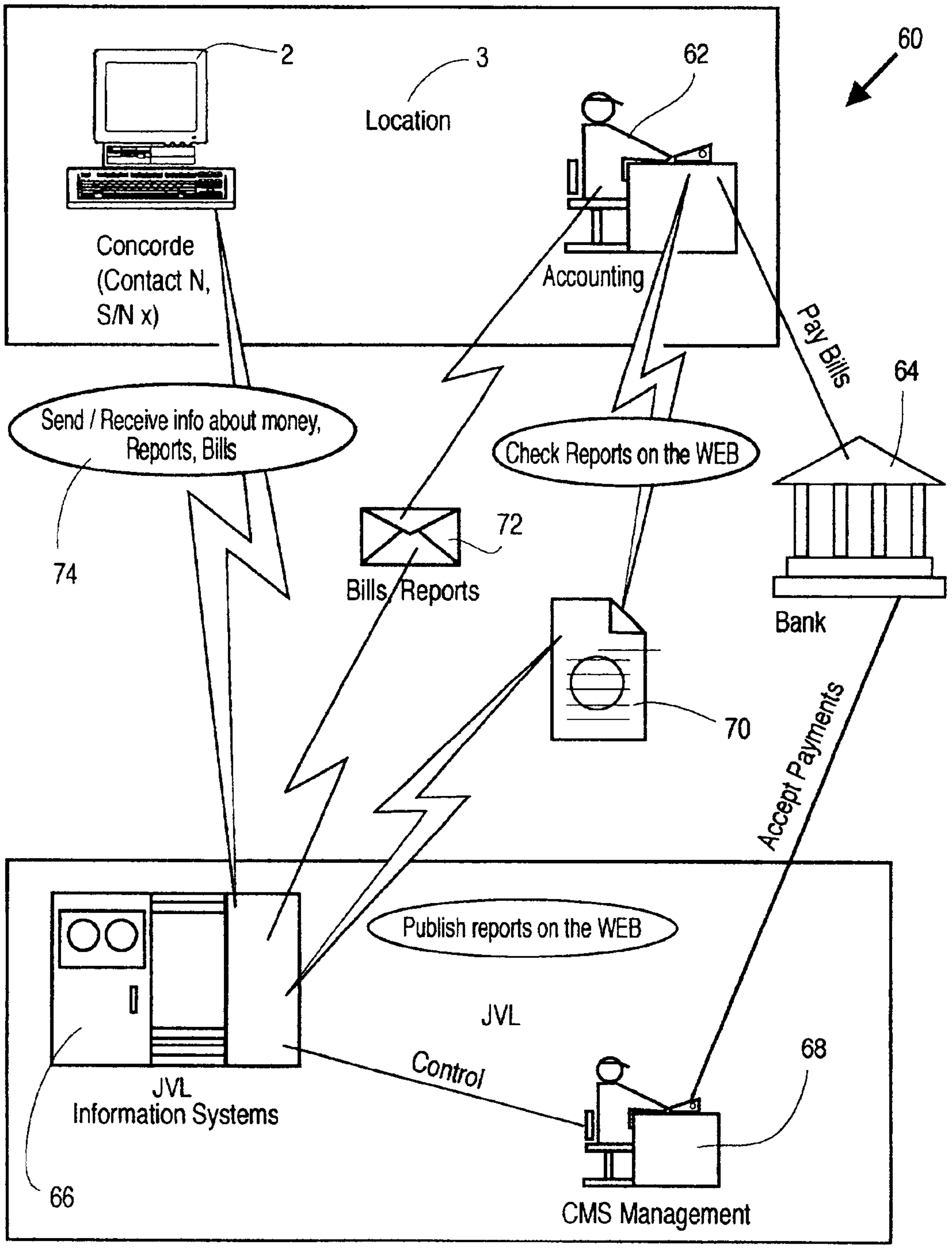
FIG. 8 is a schematic representation of a video game terminal system which allows revenue distribution between an operator and a terminal provider.

A further feature of the invention is shown in the system of FIG. 8. A host of video game terminals 2 are connected to a computer 66 and provide this central computer with information identifying the particular terminal, the location of the terminal, and counting information regarding the number of games played, identification of which games have been played, the revenue that has been received by the video game terminal, and user information. The central computer 66 tabulates the results from the individual terminal and combines them if there are a number of terminals at a particular location, and provides a report to the particular location. The report can be provided through the mail as indicated by communication line 72, back to the individual terminals indicated by the communication path 74, or can be posted on a webpage or sent by e-mail as indicated by path 70. In all cases, the accounting department of the particular location is provided with a report and bill information regarding the revenue collected by the individual terminals.

The operator of the particular location is provided with the keys to the cash box and is responsible for removing the funds which have been received. The bills that are provided to the particular location provide a summary of the revenue received and the portion of this revenue which is due to the terminal provider. In the system shown, the accounting group 62 of the location, authorizes a financial institution 64 to debit the account of the terminal provider.

If there is any dispute at the particular location between the funds collected and the report provided by the central computer, these can be immediately identified and resolved. If a particular location is always short, the terminals can be removed by the terminal provider as the report should be accurate. The terminal provider can also provide statistics of other locations regarding the accuracy of the reports. This arrangement provides an electronic reporting of revenue generated by particular terminals and avoids the necessity of having both parties present to empty the cash box and distribute the funds. It can be appreciated that this electronic system can involve a financial institution such that the funds can be electronically transferred from one account to another, based on the reports.

Appendix A lists one set of possible contest rules. These rules preferrably can be accessed at each terminal (see FIG. 5) and displayed on the terminal screen. The rules preferrably allow entry into the draw without any use of the terminal. Any party of an eligible age can mail in an entry to a particular location and if the entry meets the particular requirements, it will be entered in the draw. This capability may be required by certain jurisdictions for the draw to be acceptable.

With the present invention, the terminal provider as well as the operator can be provided with additional information which identifies the users of the terminals and the frequency at which the terminal is used by a particular user and the games selected by the user.

In a further option of the invention, it is possible to have a user purchase a home version of one or more of the games or certain games that are available for sale. The user can merely activate a purchase game icon, select the particular game which he is interested in purchasing and provide information with respect to the delivery of the game. Payment is made using the coin acceptor, or the bill validator, or a build-in credit/debit card reader. Preferrably, the purchase information is provided to a central computer and the computer game is delivered to the user by e-mail. Other delivery arrangements are possible.

The terminal has been described as having a touch screen input, however, a touch pad is also possible. The touch pad is less expensive but is typically more limited with respect to display capabilities.

As outlined above, video games terminals which accommodate a tournament mode and preferably a networked tournament mode encourage frequent play and typically increase the revenue received. It is also desirable, from the operator's position, to accumulate information with respect to the players using the video game terminals and the present system encourages registration of players.

In a further embodiment of the invention, the video game terminal includes a tournament mode that is associated with one or more games where a prize or series of prizes are awarded, based on score. To qualify for the tournament, the video game terminal has a number of possible arrangements for providing players with a free entry to a particular tournament. As the entry to the tournament is free, the tournament with a specific prize is legal in many jurisdictions. Thus the video game terminal can have a first tournament mode for fame where there are no prizes associated with the particular high scores on a terminal and network basis and a second tournament mode for prizes where free entries are provided based on certain procedures or a random event associated with the playing of the various games of the terminal.

The free entry in a tournament for prizes can have a number of different ways to award the free entry. For example, free entry could be provided each time a player signs on and this incentive will also improve the quality of information being tracked with respect to the players' habits. Free entry or perhaps a number of free entries could be awarded for a new registration of a particular player. Other arrangements include free entries being awarded based on a player being signed on and a particular random event associated with a game or based on a random time. This ability to provide free entry in a tournament for prizes could also be based on a random draw of signed on players at a specified time or over a certain period of time. In this way, players are encouraged always to sign on to qualify for this additional benefit. It would also be possible to provide a free entry in a tournament for prizes based on certain steps or events within a game. Certain events within a game can be identified and a smaller combination of these events could be determined to be the particular sequence which if occurs within a particular game, a free entry is provided.

As can be appreciated, it would be preferable if the player signs on before commencing play on the terminal. In this way, the tracking of the various games will improve the database of information with respect to the customer base. It is often found that a player merely skips the sign on process and remains anonymous. With respect to the free entry in the tournament and the ability to qualify for the random draw, the terminal can track a non signed on player's activities and upon effective termination of that player's continuous activity, can provide an opportunity for the anonymous player to sign on and achieve the benefits of any qualifying activities that have occurred during his time of play. For example, he may have achieved a number of free entries in a tournament for prizes, it could also identify that certain free entries in a random draw are available if he signs on. The terminal provides a short period of time to claim this benefit by signing on. Typically there can be a short time period after each game where the sign on can be completed. Upon the expiry of the time and assuming active play has terminated, the terminal returns to an "attract" mode as opposed to an "active game" mode.

This option or incentive to sign on can be an option that is available whenever the terminal is active. The "benefits" can also be summarized to provide a further incentive.

The ability of the terminal to track the activities when it is being actively used by a particular player and to accumulate any benefits and display those benefits during play, between play and upon termination by the player, will act as a further incentive to convert what were unknown game player activities to the activities associated with a particular registered player. The game terminal typically distinguishes between an active game mode and an attract mode, and upon recognition that the active mode is terminated can extend it for a short period of time to allow registration if the player so desires.

The video game terminal with the capability to allow free entry in a random draw based on games played or free entry in a tournament for prizes, or tournaments for personal satisfaction or publication, appeals to a host of different types of players and provides increased information regarding the tracking of each individual player. In addition, it allows the operator of the video game terminal to configure the games associated with tournaments for prizes versus tournaments for fame, and can act as a promotion to encourage certain new games or certain games which are underplayed in a particular location. This arrangement can also be used to effectively diversify certain players who otherwise would merely specialize in one particular game or tournament arrangement.

The free entry tournament mode for prizes can be used alone or in competition with tournament mode for personal satisfaction or other incentive arrangements. Combining various incentive or promotional activities increases the market appeal. Although a video game terminal with several incentive modes is desirable, a video game terminal with free entry tournament mode alone provides improved player tracking and increased use, and is part of the present invention.

This system also provides flexibility to encourage additional play during particular time periods. For example, certain time periods could have increased benefits or incentives to encourage extended use or group play. The video game terminal with these types of features provides additional flexibility for the operator to derive information specific to the terminals and locations and devise specific strategies to encourage increased use of the terminal, either by time or types of games played, or in other ways. The individual players are encouraged to sign on initially and are also encouraged to sign on at the end of a particular sequence by posting of the free benefits that they may have achieved.

It is anticipated that a video game terminal or network of terminals which communicate with a central database computer which has all of these features described above will be the preferred embodiment. However, it can be appreciated that a video game terminal which operates with any of these embodiments can improve the tracking of players and the frequency of use. The present system has been described with the capability to operate in all of these modes, however, it also allows the flexibility to provide incentives for the particular jurisdiction where the terminal is located. In some jurisdictions, one form of incentive or bonus may not be legal and would not be available in that jurisdiction. The incentives that are legal in that jurisdiction can be used. From time to time the legal requirements in various jurisdictions change and this added incentive program can be activated in those jurisdictions. Thus the network system could have some game terminals operating with all incentives and other game terminals only operating with a limited number of incentives. It also allows for flexibility with respect to encouragement of individual games by having the incentives associated with those particular games or the tournaments associated with those particular games. Thus the system provides effective promotions tailored to the jurisdiction in which the terminal is located.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A networked system of pay to play video terminals which communicate with a remote central computer for entry of players in a random draw, each video terminal comprising a series of games displayed on said terminal for selection and play by a user, said series of games including identification of a limited portion thereof eligible for said random draw, a payment arrangement for receiving payment and authorizing initiation of a game from a series of games retained in memory, a registration query allowing registration of a new user or entry of a PIN assigned to a previously registered user for identification of the user with respect to said random draw, a counting arrangement for maintaining a count for each registered user which count is incremented based on the play of each eligible game associated with the registered user, and a communication arrangement for communicating with said separate remote computer and providing thereto the counts of the different registered users for entry in the random draw based each count providing an opportunity to win, wherein the eligible games for the random drawn can vary between networked terminals.

2. A networked system as claimed in claim 1 wherein said registration query when completed causes said video terminal to complete a communication with said remote computer to record the registration with the remote computer and have a PIN assigned and communicated to said game apparatus.

3. A networked system as claimed in claim 1 wherein said remote computer and said game apparatus communicate in a predetermined manner and said game apparatus provides new registrations to said remote computer on a batch basis.

4. A networked system as claimed in claim 1 wherein said remote computer from time to time provides each terminal with a number of PINs and each terminal assigns one of said PINs to each new registration to uniquely identify the registration by said assigned PIN.

5. A networked system as claimed in claim 4 wherein each terminal maintains in non volatile memory said registrations and assigned PINs until this information is reported to said remote computer.

6. A networked system as claimed in claim 1 wherein at least some of said games are operated in a tournament mode and a ranking is provided of at least several leading registered users and their particular best game results received from all terminals.

7. A video game terminal as claimed in claim 1 wherein each terminal includes user activated means for displaying the rules of the random draw contest on a touch screen of the terminal.

8. A networked system as claimed in claim 1 wherein certain of said series of games are available for purchase by a user and payment is made using said payment arrangement and delivery information is provided by the user using said touch screen to enter sufficient information to allow delivery of said game, and wherein said terminal provides said game purchase and delivery information to said remote computer for delivery of said game to said e-mail address.

9. A networked system as claimed in claim 1 wherein revenue collected by each game terminal is divided between an onsite operator and a terminal provider, said terminal maintaining an electronic count of revenue collected and communicating said electronic count to said remote computer using a communication arrangement and said onsite operator is debited for the portion of the collected revenue due to terminal provider for the benefit of the terminal provider and said operator removes and receives the benefit of the revenue collected by said video game terminal.

* * * * *